Sept. 13, 1960 A. G. BADE 2,952,165
SPEED REDUCER
Filed Nov. 5, 1957 5 Sheets-Sheet 1

INVENTOR.
Alfred G. BADE
BY
Quarles & French
Attys.

Sept. 13, 1960 A. G. BADE 2,952,165
SPEED REDUCER

Filed Nov. 5, 1957 5 Sheets-Sheet 3

INVENTOR.
Alfred G. BADE
BY Quarles & French
Attys.

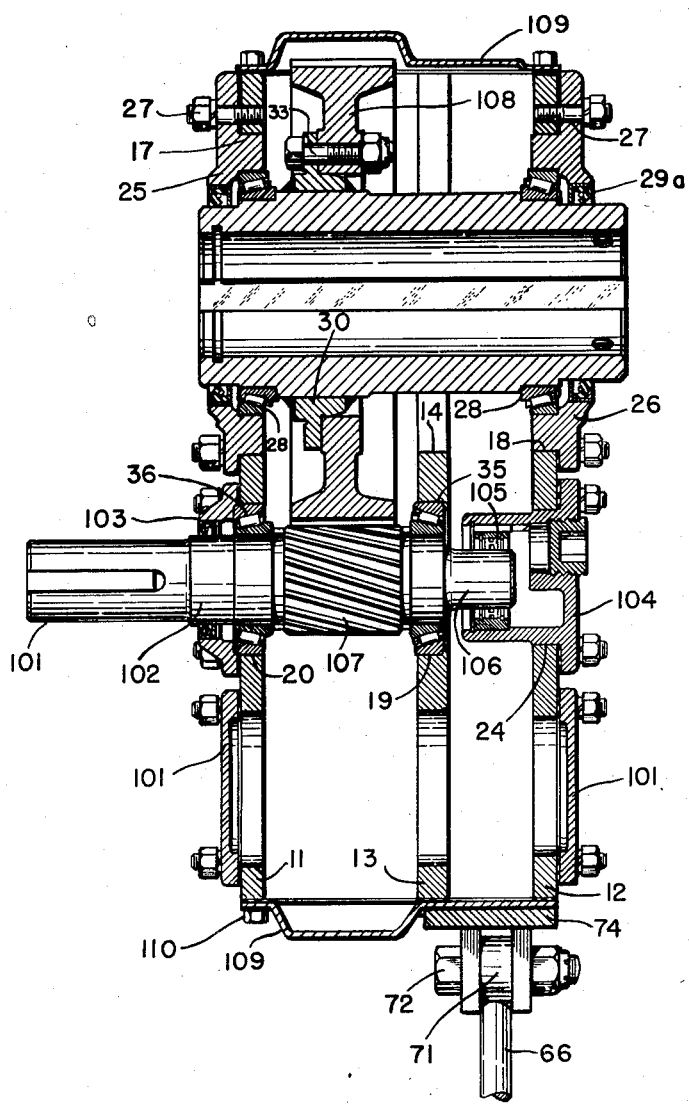

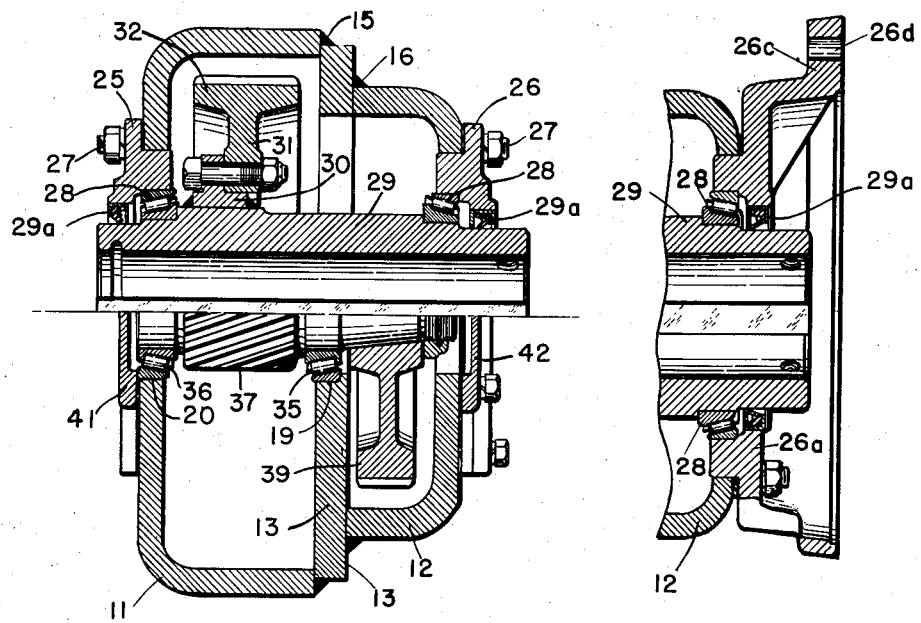
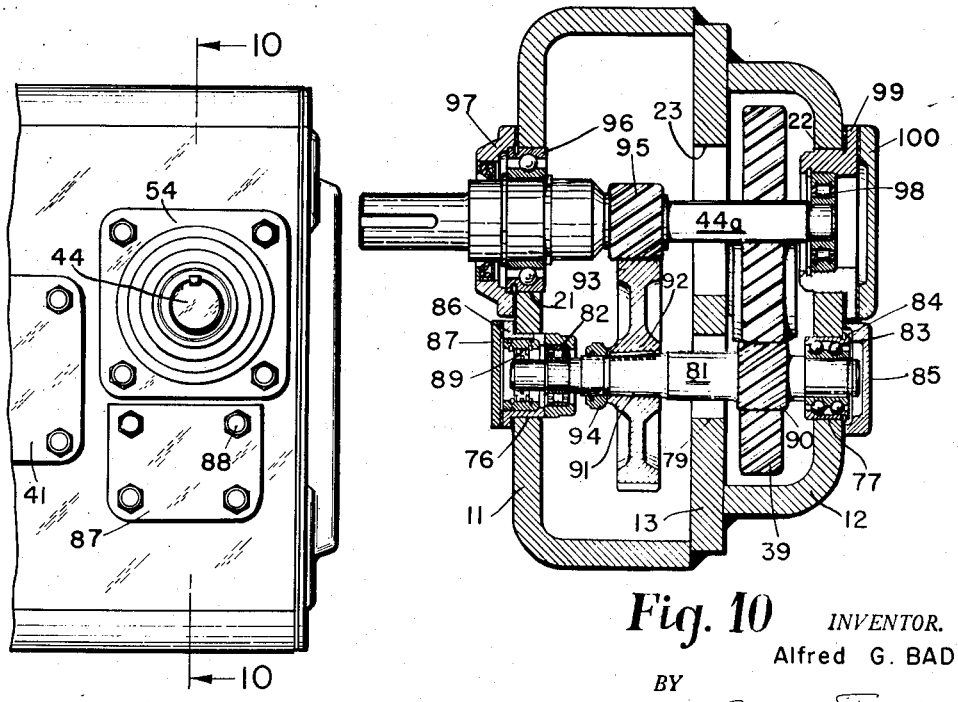

United States Patent Office 2,952,165
Patented Sept. 13, 1960

2,952,165
SPEED REDUCER

Alfred G. Bade, Brookfield, Wis., assignor to The Falk Corporation, Milwaukee, Wis., a corporation of Wisconsin Filed Nov. 5, 1957, Ser. No. 694,654

5 Claims. (Cl. 74—606)

The invention relates to speed reducers and especially to shaft mounted reducer units.

The main object of the invention is to provide a new and improved housing structure for enclosing the gearing and carrying the transmission shafts in which the main body of the housing is formed as a single one-piece unit of cold formed structural steel parts rigidly joined together by welding and which may be used for single, double or triple reduction gearing without material changes. More particularly, the main body of the housing is formed by three steel pieces, two channels and a plate joined together by automatic straight line welding to provide a rigid one-piece structure, said housing having removable steel end plates to reinforce the other pieces, act as inspection closures of gears, permit assembly of parts and provide maximum resistance to bending and deflection, openings being provided on the front and back sides of the housing to facilitate gear and bearing assembly and inspection covers normally sealing these openings which can be readily removed in the field to inspect revolving elements without disturbing the unit. This one-piece housing departs from the usual practice since the entire housing can be straddle milled, through bored, through drilled and tapped to insure proper bearing and gear alignment and eliminate any splits, dowels or separate drilling of separate parts which require bolting together that might effect such alignment.

It is to be noted that with applicant's novel housing it is possible to vary the reduction ratio or ratios by removing any one of the transmission shafts and their gears and also the drive shaft and substituting other gears and/or shafts without removing the gear reducer from the driven machine. This can easily be done on removing the inspection covers.

A further object of the invention is to provide removable bearing cages for the low speed or driven shaft to facilitate the low speed gear assembly and also to permit a flange mounting of the reducer unit by means of an adapter having a bearing cage formed therein, and also permit adjustment of the bearings exterior of the housing.

A further object of the invention is to provide a housing with extended gear centers that will permit a single, double or triple reduction gear train to be employed in the same housing, if desired, and a reducer unit that can be reverse mounted, if desired.

A further object is to provide an improved anchor bracket for resisting torsional strains so that the reaction forces do not impose any twisting to the housing with the anchor bolt in double shear.

A further object is to provide for the ready mounting of a one way clutch to the gear assembly, if desired.

The invention further consists in the several features hereinafter described and more particularly defined by claims at the conclusion hereof.

In the drawings:

Fig. 6 is a composite vertical sectional view, the upper half being taken along the line 6—6 of Fig. 3 and the lower half being taken along the line 6a—6a of Fig. 3;

Fig. 7 is a view similar to Fig. 3 showing the unit arranged for a single speed reduction;

Fig. 8 is a vertical sectional view showing a certain modification;

Fig. 9 is a side elevational view of housing when using a triple reduction;

Fig. 10 is a vertical sectional view taken on the line 10—10 of Fig. 9.

Figure 3:
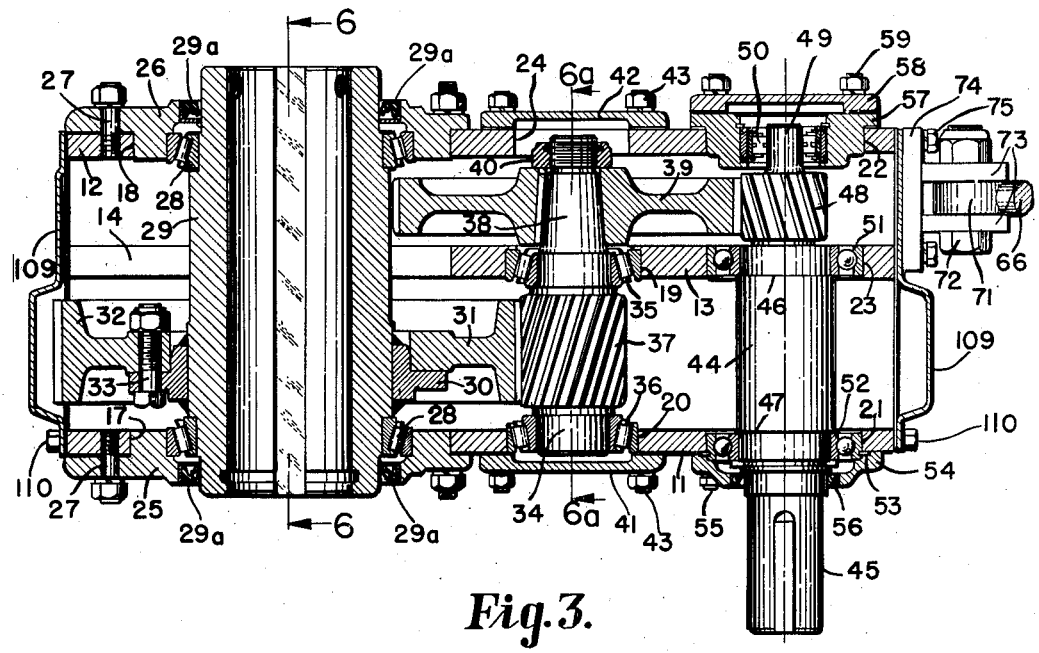
Fig. 3 is a horizontal sectional view taken on the line 3—3 of Fig. 4.
Figure 4:
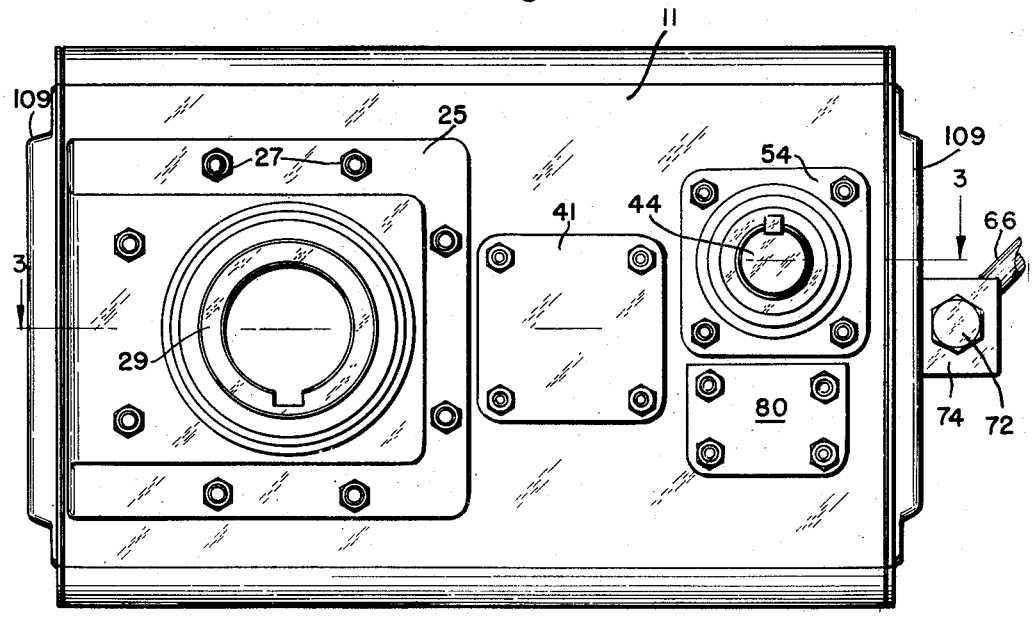
Fig. 4 is a front elevational view of the reducer as disposed in a horizontal position.
Figure 5:
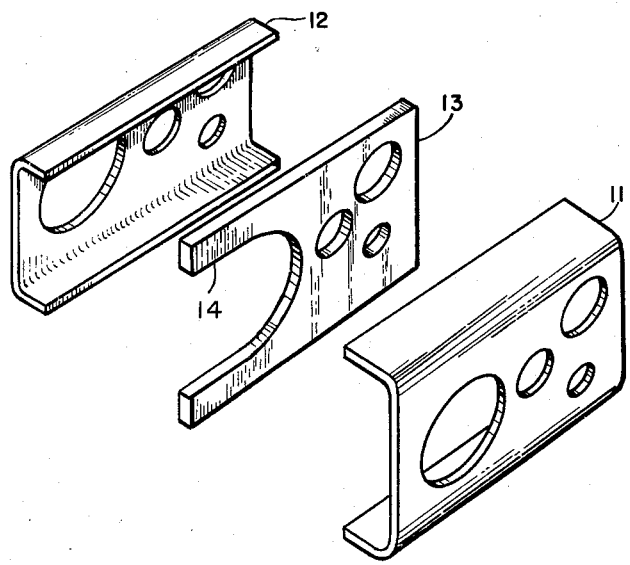
Fig. 5 is a perspective exploded view of housing parts.

Referring to Figs. 3, 5 and 6, the housing includes structural steel channel members 11 and 12, preferably having curved portions joining the webs with the flanges, and a medially disposed flat steel plate or panel member 13. These parts as shown in Fig. 5 have openings indicated therein which are flame cut to a smaller size so that they may be more readily bored out to finished size, if called for, and also include the shaft clearance slot 14. The other openings will be referred to in detail hereinafter in their finished form. The front edges of the flanges of the channel member 11 while held in contact with one side of the plate 13 are welded thereto by lengthwise extending weldments 15 and the front edges of the channel member 12 while held in contact with the other side of the plate 13 are similarly welded thereto by lengthwise extending weldments 16. This welding is done by an automatic straight line welding apparatus. Thus the main housing parts are secured together to form a rigid housing.

The outer channel members are cold formed from a flat steel plate which sets up an induced tensile stress in the outer fibres and compressive stress in the inner fibres of the bend between the web and the leg of each channel. This induced stress results in a "locked in" moment that resists lateral bending and thus counteracts the induced thrust imposed by the tapered roller bearings resulting from radial load on these bearings, hereinafter described.

The bending resistance of the channel members is further increased by rigidly connecting both ends to the center plate by welding. Furthermore, the channel member on the output side of the reducer is preferably made smaller than the other to stiffen up the output side of the reducer to offer maximum resistance to bending when subjecting the output shaft to large external loads when the flange mounting hereinafter described is used.

Thus by bending and rigidly fixing the ends of the two channel members to a center section as illustrated, there has been obtained a very effective use of materials to develop maximum resistance to bending and deflection of the housing to insure proper gear and bearing alignment.

With the parts above described firmly secured together, accurate reference surfaces for subsequent machining operations are obtained by bringing the exposed faces of the webs of the channels 11 and 12 parallel to each other by straddle milling these sides of the housing, and the ends of the housing may be similarly milled to provide finished parallel surfaces. Thereafter, the flame cut openings may be accurately through bored or through drilled and the necessary tapped holes made.

Referring to Figs. 3 and 6, the larger of the flame cut holes in the channels 11 and 12 are through bored to provide aligned openings 17 and 18, centrally located openings in the plate 13 and web of the channel 11 are through bored to provide aligned openings 19 and 20, and the channels 11 and 12 and the plate 13 are through bored to provide aligned openings 21, 22 and 23, respectively. The channel 12 has its original bored opening 24 in substantial alignment with the bores 19 and 20.

Similar low speed bearing cages 25 and 26 are mounted, respectively, in the bores 17 and 18 and secured in fixed position by bolts 27 anchored in the webs of the channels 11 and 12. The bearings 28 for these cages are of the separable type so that their outer races may be mounted in the cages and their inner races mounted on shouldered portions of a hollow quill or driven shaft 29. Each cage is provided with an oil sealing unit 29a for the shaft 29.

The shaft 29 has a flanged gear hub member 30 welded thereto to which the web 31 of a large gear 32 is secured by radially disposed bolts 33, one being shown. The gear 32 is attached to the hub by inserting it through the adjacent open side of the housing and then inserting the quill shaft assembly into the housing to bring the flange of the hub member 30 into abutting engagement with the inner rim portion of the gear 32 whose inner diameter is large enough to allow one of the bearing carrying portions of the shaft 29 to be passed therethrough.

An intermediate transmission shaft 34 is journalled in roller thrust bearings 35 and 36 mounted in the recessed bore 19 of plate 13 and the bore 20 of plate 11, respectively. The shaft 34 has a pinion 37 formed integral therewith and adapted to mesh with the gear 32 when said shaft is introduced into the housing through the opening 20 and its outer end through the inner bearing race of the bearing 35. Thereafter, the bearing 36 is inserted into opening 20 to bring it into assembled relation with the adjacent end of the shaft 34. The outer end 38 of the shaft 34 is tapered to fit the tapered bore of the hub of a large gear 39 which is inserted laterally through the then open right hand side of the housing prior to inserting the shaft 34 into the housing so that the above named tapered parts can be coupled and keyed together and the gear 39 firmly secured by a nut 40 mounted on the threaded end of the shaft 34, the opening 24 being large enough to permit of the use of a socket wrench for this purpose. On completion of this shaft assembly the openings 20 and 24 are sealed off by cover plates 41 and 42, secured to their associated housing part by bolts 43.

A drive shaft 44 has an exposed coupling extension 45, spaced shoulders 46 and 47, a pinion 48 formed integral therewith or secured thereto, and an end 49 for connection, if desired, with a suitable one way clutch structure 50 of known construction. A bearing 51 is mounted on the shaft 44 to abut the shoulder 46 and is moved into place in the bore 23 when said shaft is inserted from the front as viewed in Fig. 3 to bring its pinion 48 into meshing engagement with the large gear 39 at the same time bringing a bearing 52 abutting the shoulder 47 into position in the bore 21. The outer race of the bearing 52 is retained in position by a retainer ring 53 mounted in said race and having an outwardly extending portion clamped between the finished face of the web of channel 11 and a cap 54 secured by bolts 55 to said channel, said cap having a shaft oil seal unit 56 mounted in it. The opening 22 is closed off by a cap member 57 which in the present instance forms a cage for the clutch structure 50 and its upper end is closed off by closure plate 58 which with the cage is secured to the web of channel member 12 by bolts 59.

With the construction as above described, rotative power applied to shaft 44 is transmitted through pinion 48 and gear 39 to shaft 34 for the first reduction and through pinion 37 and gear 32 to the driven shaft 29 for the second reduction.

Figure 1:
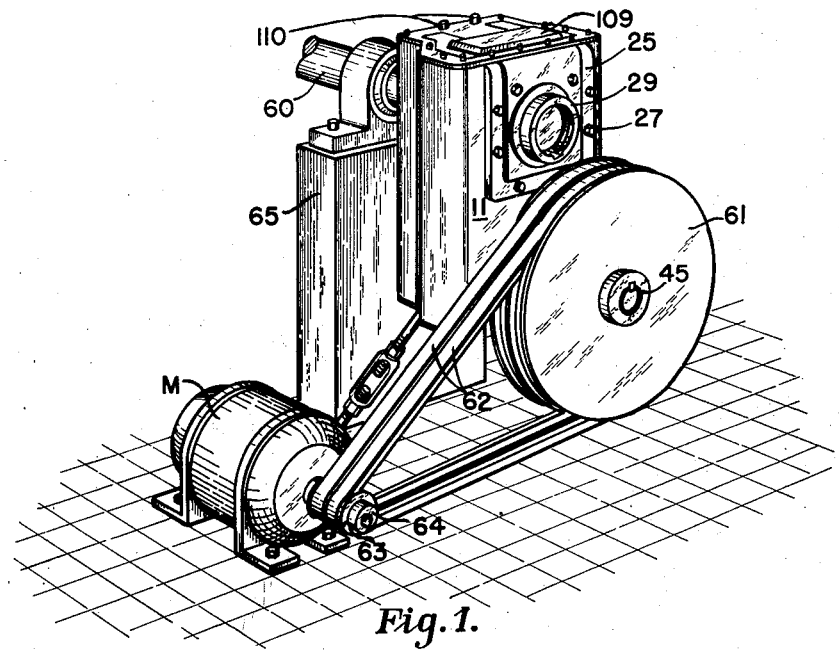
Fig. 1 is a perspective view of a speed reducer embodying the invention arranged with what may be considered the front side outermost.
Figure 2:
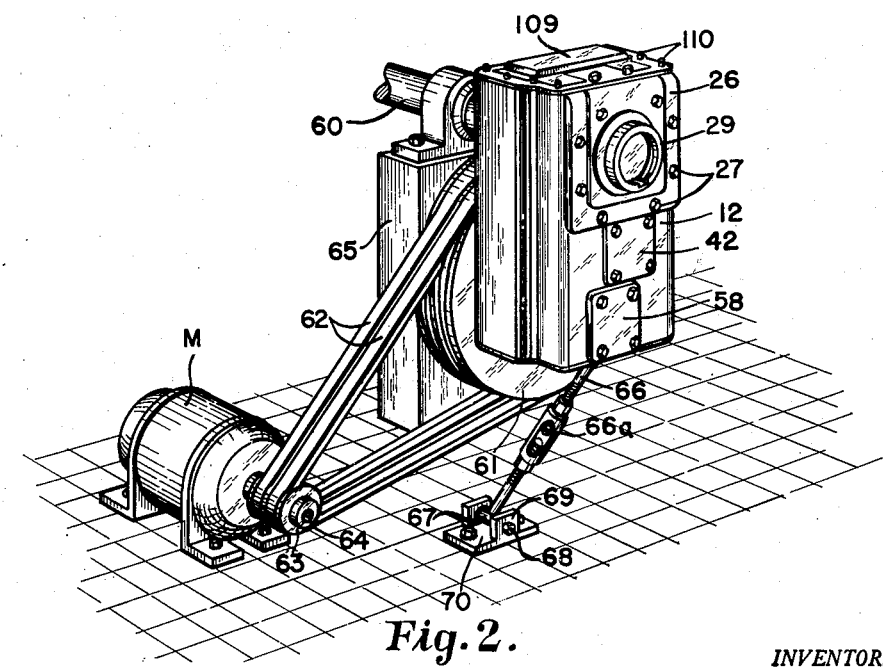
Fig. 2 is a similar view showing the rear side outermost.

In Figs. 1 and 2 the reducer unit has been shown as mounted on the extended end of a shaft 60 forming a part of or coupled to the mechanism or apparatus to be driven, the drive shaft 44 having a multiple grooved pulley 61 suitably mounted thereon and connected by V-belts 62 to a grooved pulley 63 on the shaft 64 of an electric motor M. Fig. 1 shows the unit mounted so that drive shaft 44 with its pulley is outermost, but if conditions require it or it is considered desirable, the unit may be reversed as shown in Fig. 2 so that the pulley 63 is disposed inwardly of the unit between the journal support 65 for the shaft 60 and the housing.

In either case, torsional strains that may be set up by the gearing and tending to rotate the housing relative to the driven shaft are resisted by a torsion link connection with a fixed support including an articulated link member 66 having an adjustable turnbuckle connection 66a between some of its parts, one end of said link having a sleeve 67 pivotally mounted on a shaft 68 carried by the spaced arms 69 of a floor bracket 70, the other end 71 being an eyed end pivotally mounted on a bolt 72 carried in the spaced arms 73 of a bracket 74 that is anchored to the housing by bolts 75 mounted in the channel 12 and panel 13 as indicated in Fig. 3 so that this bracket has a large bearing area connection with the housing to prevent the reaction forces imposing any twisting action to the housing and put the anchor bolt in double shear relation with said link.

For the triple reduction, as shown in Fig. 10, certain of the flame cut openings are finished bored to provide aligned bores 76 and 77 in the channels 11 and 12 and an aligned flame cut opening 79 is provided in the panel 13. These aligned openings are disposed beyond the previously referred to openings 21, 22 and 23 and axially offset therefrom and the bores 76 and 77 may be covered over by end plates 80 if a triple reduction is not desired. Where a triple reduction is desired, a second transmission shaft 81 is adapted to have its ends journalled in bearings 82 and 83, the bearing 83 being mounted in the bore 77 and secured in position by a retainer ring 84 and cap 85 bolted to the casing similar to the cap 41. The bearing member 82 is mounted in a cage member 86 mounted in the bore 76 and with a cover 87 is secured to channel member 11 by bolts 88. In this instance a one way clutch structure 89 may be mounted in the cage 86 and operatively secured to the adjacent outer end of the shaft 81.

The shaft 81 has a pinion gear 90 formed integral therewith or secured thereto adapted to mesh with a larger gear such as the gear 39 on the shaft 34 and has a tapered portion 91 for keyed connection with the taper bored hub 92 of a large gear 93 locked in position by the nut 94, the assembly of this shaft unit being accomplished by the introduction of this shaft through the right hand end of the housing as viewed in Fig. 10 and the attaching of the gear 93 to the shaft after its introduction through the adjacent open end of the housing. In this instance a drive shaft 44a, generally similar to the shaft 44 except for the positioning of its pinion gear 95 thereon, is mounteded in a bearing 96 mounted and secured in the bore 21 of the housing in a manner similar to the bearing 52 and having a cap 97 similar to the cap 54 bolted to the housing and is also mounted in a bearing 98 carried by a cage 99 provided with a cap 100, said cage and cap being suitably bolted to the housing similar to the cage 57 and cap 58 previously described. The cage 99 is mounted in the bore 22 in the housing. The pinion 95 meshing with the larger gear 93 provides a third reduction over the first described form.

There may be special instances where it is desirable to provide a fixed support mounting between the reduction unit and the shaft to be driven thereby in which instance instead of the torsion link and the cage 26, a special cage 26a, shown in Fig. 8 in a section taken similar to Fig. 6 along the line 6—6, may be provided which while similar to the cage 26 as regards its mounting in the housing and on the shaft 29 has a flanged base portion 26c provided with holes 26d for the reception of bolts (not shown) for securing said cage to a fixed support adjacent the shaft to be driven, this mounting being effected without any change in the other parts of the reducer except those mentioned.

As shown in Fig. 7, for a single reduction unit, the shaft 44 is omitted and its bearing openings covered by caps 101, similar to the cap 42, a drive shaft 102 is substituted for the intermediate shaft 34 for mounting in the same bearings 35 and 36, shown in Fig. 3. In place of the closure cap 41, a cap 103, similar to the cap 41, is used at the protruding end of the shaft 102 and a cap 104, bolted to channel 12, is mounted in the bore 24 and has a one way clutch 105 similar to the clutch structure 50 mounted therein to cooperate with the end 106 of said shaft 102. The shaft 102 has a pinion 107 formed integral therewith or secured thereto meshing with a large gear 108 similar to the gear 31 and secured to the driven shaft 29 by the member 30 as previously described in connection with Fig. 3, other parts being identical with similar parts in Fig. 3 and similarly designated.

It is to be noted that whatever gear reduction assembly is used, after such assembly, end plates 109 are attached in place on the ends of the housing by bolts 110 and either of these plates may be subsequently removed for inspection of the unit or for substitution of new parts, if necessary.

It is also to be noted that gearing can be added in the field and that the triple reduction arrangement is accomplished by sets of shafts spaced lengthwise along the front and back of the housing.

I desire it to be understood that this invention is not to be limited to any particular form or arrangement of parts except in so far as such limitations are included in the appended claims.

What I claim as my invention is:

1. In a speed reducer unit, the combination of shafts and intermeshing reduction gearing carried by said shafts, and a housing for enclosing said gearing and carrying said shafts comprising a pair of structural steel channel members and a panel member with which the outer edges of the flanges of the channels are integrally united and by which oppositely disposed compartments are provided having open ends for the insertion and withdrawal of reduction gears that may be used in the unit, removable closure means for the ends of said compartments, the outer surfaces of the webs of said channels being parallel to each other to provide reference surfaces, said housing having spaced sets of aligned bores extending normal to said reference surfaces for the mounting of the shafts used in said unit.

2. In a speed reducer unit, the combination of shafts and intermeshing reduction gearing carried by said shafts, and a housing for enclosing said gearing and carrying said shafts, and comprising a pair of structural steel channel members and a panel member with which the outer edges of the flanges of the channels are integrally united, removable closure means for the ends of said housing, the outer surfaces of the webs of said channels being parallel to each other to provide reference surfaces, said housing having sets of aligned bores extending normal to said reference surfaces and spaced apart longitudinally of the webs of said channel members for the mounting of shafts used in said unit, the web of the channel for the output side of the unit being narrower than that for the input side of the unit.

3. The speed reducer unit as defined in claim 1, wherein the channel members are of cold formed steel with curved joining portions between their webs and flanges to provide resistance to lateral bending of their webs under forces imposed by bearings mounted therein.

4. In a speed reducer unit, the combination of a housing having spaced channels and a flat steel plate integrally united with the inwardly facing edges of the flanges of said channels and providing longitudinally extending open ended compartments, closure means for the open ends of said compartments, a hollow driven shaft extending through the webs of said channels and having a gear hub member integrally united thereto, a large gear disposed in one of said compartments and detachably connected with said hub member, the webs of said channels having aligned bores of a diameter to admit said hub member on the insertion of said shaft through said bores, and bearing cages for said shaft mounted in said bores and detachably secured to said housing.

5. The speed reducer unit as defined in claim 4, wherein one of said bearing cages is formed to provide a flanged mounting extending around said hollow shaft for connection with a fixed support.

References Cited in the file of this patent

UNITED STATES PATENTS

| | | |
|---|---|---|
| 664,386 | Davidson | Dec. 25, 1900 |
| 1,971,968 | Schmitter | Aug. 28, 1934 |
| 2,474,726 | De La Source | June 28, 1949 |
| 2,503,027 | Christian | Apr. 14, 1950 |
| 2,556,259 | Dorris | June 12, 1951 |
| 2,655,818 | Bodle | Oct. 20, 1953 |
| 2,681,578 | Shields | June 22, 1954 |
| 2,762,232 | Bade | Sept. 11, 1956 |
| 2,813,435 | Schumb | Nov. 19, 1957 |